United States Patent
Gadnir et al.

(10) Patent No.: US 9,936,162 B1
(45) Date of Patent: Apr. 3, 2018

(54) SYSTEM AND METHOD FOR PROCESSING DIGITAL IMAGES DURING VIDEOCONFERENCE

(71) Applicant: Avaya Inc., Santa Clara, CA (US)

(72) Inventors: Guy Gadnir, Herzlia (IL); Tamar Barzuza, Tel Aviv (IL)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 15/285,277

(22) Filed: Oct. 4, 2016

(51) Int. Cl.
*H04N 7/14* (2006.01)
*H04N 5/232* (2006.01)

(52) U.S. Cl.
CPC ......... *H04N 7/147* (2013.01); *H04N 5/23203* (2013.01); *H04N 5/23296* (2013.01)

(58) Field of Classification Search
CPC .................. H04N 5/23203; H04N 5/23296
USPC ............... 348/14.01–14.16; 370/259–271; 370/351–357; 379/202.01–207.01; 709/201–207, 217–248
See application file for complete search history.

(56) References Cited

U.S. PATENT DOCUMENTS

| | | | |
|---|---|---|---|
| 5,745,711 A | 4/1998 | Kitahara et al. | |
| 7,167,519 B2 * | 1/2007 | Comaniciu | H04N 19/23 375/240.08 |
| 7,487,210 B2 | 2/2009 | Ludwig et al. | |
| 8,289,371 B2 | 10/2012 | Wagner et al. | |
| 9,076,028 B2 | 7/2015 | Summers | |
| 9,197,856 B1 | 11/2015 | Tangeland et al. | |
| 2007/0076099 A1 * | 4/2007 | Eshed | H04N 5/23232 348/218.1 |
| 2008/0298571 A1 | 12/2008 | Kurtz et al. | |
| 2011/0085017 A1 | 4/2011 | Robinson et al. | |
| 2015/0172562 A1 * | 6/2015 | Mauchly | H04N 5/2628 348/14.08 |
| 2016/0057391 A1 | 2/2016 | Block et al. | |
| 2016/0142672 A1 | 5/2016 | Bostick et al. | |
| 2016/0255126 A1 | 9/2016 | Sarris | |
| 2016/0255287 A1 | 9/2016 | Mabuchi | |
| 2016/0260236 A1 * | 9/2016 | Fogarty | G06T 3/40 |

OTHER PUBLICATIONS

Official Action for U.S. Appl. No. 15/285,252, dated Jan. 27, 2017 12 pages.
Notice of Allowance for U.S. Appl. No. 15/285,252, dated May 23, 2017 11 pages.
"Data Sheet Polycom EagleEye Director Specifications," Polycom, Inc., © 2014, 2 pages.
U.S. Appl. No. 15/285,252, filed Oct. 4, 2016, Gadnir et al.

* cited by examiner

*Primary Examiner* — Hemant Patel
(74) *Attorney, Agent, or Firm* — Sheridan Ross P.C.

(57) ABSTRACT

A video communication system that includes a computer readable medium and a processor, coupled with a wide angle and high resolution digital camera and the computer readable medium. The processor causes the wide angle and high resolution digital camera to acquire a digital image of a local participant during a video communication session. The processor extracts a first image of a first set of objects and a second image of a second set of objects from the digital image and provides the extracted first and second images to a remote endpoint for display to another participant.

20 Claims, 8 Drawing Sheets

SYSTEM AND METHOD FOR PROCESSING DIGITAL IMAGES DURING VIDEOCONFERENCE

FIELD

The disclosure relates generally to video communication and particularly to image capture device control in video telecommunication.

BACKGROUND

Video conferencing solutions enable manual adjustment of Pan Tilt Zoom (PTZ) cameras via a remote control. Common practice is to adjust a camera manually with every meeting start to optimize the view for that specific meeting.

In two-camera solutions, it is common practice to have one camera still and transmitting video while the other camera is moving and searching for a next optimal point of view. When the next optimal point of view is identified, the system switches to that camera for video transmission and the other camera is moved to search for the next optimal point of view. Two-camera solutions use microphone array technology for speaker tracking and constantly switch between active speakers. This is not only an expensive solution but also limits the view to only one participant at-a-time. Other participants are therefore unable to view the entire meeting room during the video conferencing session, which can cause an unsatisfactory experience for remote participants.

SUMMARY

These and other needs are addressed by the various embodiments and configurations of the present disclosure.

A video communication system can include:
a computer readable medium; and
a processor, coupled with a wide angle and high resolution digital camera and the computer readable medium.

The processor causes the wide angle and high resolution digital camera to acquire a digital image of a local participant during a video communication session, extracts a first image of a first set of objects and a second image of a second set of objects from the digital image, and provides the extracted first and second images to a remote endpoint for display to another participant.

The field of view of the digital camera can be at least about 100 degrees, and the resolution of the digital image can be at least about 10 million pixels.

The first and second sets of objects are typically contained in a common digital image.

The first and second images are not generally selected based on active speaker detection or tracking.

The video calling system can use only one camera and still provide innumerable different views of selected object sets within the captured image. Digital image processing of the image information can be done quickly and inexpensively to provide substantial real time images for a display layout of multiple images provided to remote participants.

The video communication system can further include an imaging controller that causes the processor to select the image to be captured by the camera for provision to the remote endpoint.

The image selection can be based on information describing the local participant or context of the video communication session.

The processor can condition a change from providing, to the remote participant endpoint, a first image of a first set of objects selected at a first time to a different second image of a second set of objects selected at a second time upon a difference between the first and second times having at least a threshold magnitude.

The processor commonly controls a pan, tilt, or zoom of the camera.

The information describing a local participant or context of the video communication session can include one or more of local participant location based upon detection of a face of the local participant, an identity of the local participant, and movement of the local participant from one location to another.

The information describing a local participant or context of the video communication session can include one or more of use of a key word or phrase spoken by a participant during the video communication session, an estimated meeting duration, and a meeting type or structure.

The context of the video communication session can determine a point of local participant focus based on one or more image processing or meeting content analysis.

The above system and method can enable a videoconferencing system to auto-adjust the tilt, pan, and zoom of only one camera to optimize the video experience of the local and remote participants based on analytics and other inputs. The use of a time threshold and rules typically cause the processor to perform only a few adjustments throughout the entire meeting that will provide an optimal view according to a predetermined definition or set of criteria. It can be relatively inexpensive compared to multi-camera solutions. It can allow the remote participants to view the entire room rather than only one participant at a time and the resulting experience can be satisfying for remote participants. Conventional systems, in contrast, use audio tracking and multiple cameras, causing fast and repetitive transitions between speakers and substantial participant distraction, particularly in large conference rooms. The system and method of this disclosure can use only one camera yet identify dynamically the optimal view of the room at specific points in time during the meeting, thereby providing a much better viewing experience for remote participants.

The present disclosure can provide a number of other advantages depending on the particular configuration.

These and other advantages will be apparent from the disclosure contained herein.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "biometric information" is any information that can be used in biometric verification to identify uniquely a selected person, including one or more distinguishing biological traits. Unique identifiers include, for example, fingerprints, hand geometry, a facial feature such as earlobe geometry, retina and iris patterns, and the like, voice waves, DNA, and signatures. Facial recognition, for example, can be used to biometrically verify a selected person's identity.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "electronic address" refers to any contactable address, including a telephone number, instant message handle, e-mail address, Universal Resource Locator ("URL"), Universal Resource Identifier ("URI"), Address of Record ("AOR"), electronic alias in a database, like addresses, and combinations thereof.

The term "face detection" refers to an algorithm for detecting a face of a subject in a captured image by applying digital image processing techniques to image information (either still or video frame). Such algorithms include the Viola-Jones face detection algorithm (which uses Haar feature selection, integral image creation, Adaboost training, and cascading classifiers to effect face detection) and implementations thereof (such as the MATLAB and OpenCV implementations of the algorithm), KLT algorithm (which acquires numerous feature points by first scanning the face, these points then may be detected and tracked even when the face is tilted or turned away from the camera) and implementations thereof, and other techniques known to those of skill in the art.

The term "facial recognition" or "face recognition" refers to an algorithm for identifying a person's identity based on a detected facial image of the person by applying digital image processing techniques to image information (either still or video frame). One of the ways to do this is by comparing selected facial features from the image and a facial database. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. Template matching techniques applies a template to a set of salient facial features, providing a compressed face representation. Recognition algorithms can be divided into two main approaches, geometric, which looks at distinguishing features, or photometric, which is a statistical approach that distills an image into values and compares the values with templates to eliminate variances. Common recognition algorithms can use Principal Component Analysis using eigenfaces, Linear Discriminate Analysis, Elastic Bunch Graph Matching using the Fisherface algorithm, the Hidden Markov model, the Multilinear Subspace Learning using tensor representation, the neuronal motivated dynamic link matching, SVM, maximal rejection classifier ("MRC"), and other techniques known to those of skill in the art.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The term "multipoint" conferencing unit refers to a device commonly used to bridge videoconferencing connections. The multipoint control unit can be an endpoint on a network that provides the capability for three or more endpoints and/or gateways to participate in a multipoint conference. The MCU includes a mandatory multipoint controller (MC) and optional multipoint processors (MPs).

The term "video" refers to any relevant digital visual sensory data or information, including utilizing captured still scenes, moving scenes, animated scenes etc., from multimedia, streaming media, interactive or still images etc.

The term "videoconferencing" refers to conduct of a videoconference (also known as a video conference or videoteleconference) by a set of telecommunication technologies which allow two or more locations to communicate by simultaneous two-way video and audio transmissions. It has also been called 'visual collaboration' and is a type of groupware. Videoconferencing differs from videophone calls in that it's designed to serve a conference or multiple locations rather than individuals.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
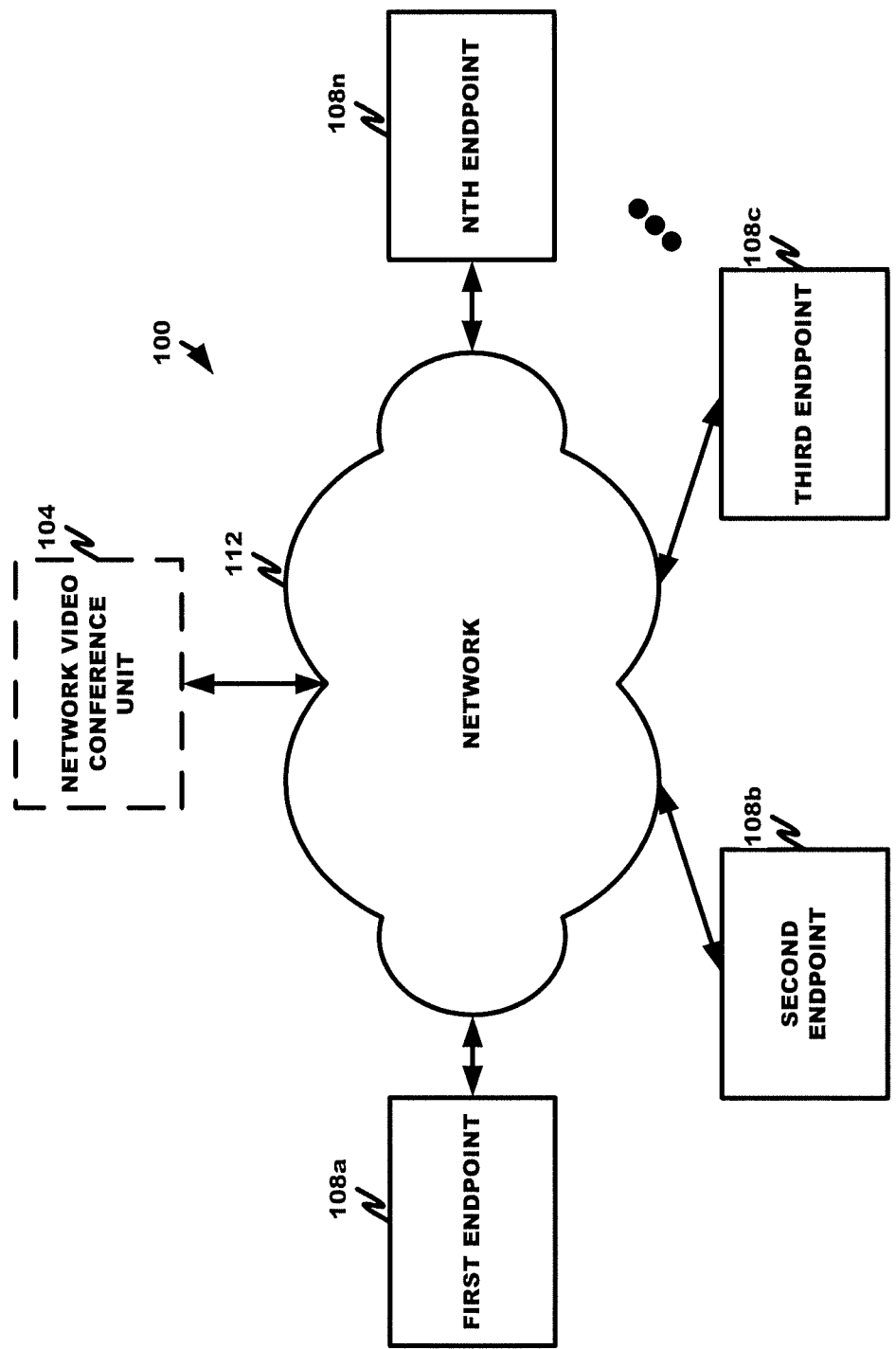
FIG. 1 is a block diagram depicting a system configuration according to an embodiment of the disclosure.

The conferencing system 100 of FIG. 1 generally includes an optional network video conference unit 104 and first, second, third, . . . nth endpoints 108a-n, interconnected by a network 112. While the first and second endpoints 108a,b are depicted, it is to be appreciated that more endpoints can be present and participating in the video conference. The conferencing system 100 can be a personal video conferencing system between two users communicating one-on-one or point-to-point (in which case no MCU is required), a group video conferencing system among three or more people, a mobile video conferencing system involving one or more mobile endpoints and can be a software only solution, hardware only solution, or combination of software and hardware solutions.

The optional network video conference unit 104 can be any network multipoint conferencing unit ("MCU") or video conferencing server ("VCS"). During a multipoint conference session, the MCU can manage multiple endpoints at once, coordinate the video data processing of the multiple endpoints, and forward the flow of media streams among the multiple endpoints. The MCU can conduct group video conferences under the principle of mixing media streams, i.e. mixing and re-encoding participants' video conferencing streams in real time. For example, the MCU can create a picture-in-picture effect. The MCU in most applications includes a multipoint controller ("MC") and optionally one or more multipoint processors ("MPs"). The MCs can coordinate media stream processing parameters between endpoints and typically support the H.245 protocol. The MPs can process, mix and switch multimedia streams.

In contrast, a VCS often implements a multiplexing pattern of the data streams, which implies no transcoding. The VCS typically redirects the media streams of the video conference participants. The compression/decompression and media stream mixing functions are generally performed in the endpoint devices.

The network video conference unit 104 can service any conference topology, including a centralized conference, decentralized conference, or hybrid conference topology. Exemplary video conference units that can be modified as set forth herein include the ELITE 6000™, 6110™, 6120™, 5000™, 5105™, and 5110™ products of Avaya, Inc.

The first, second, third, . . . nth endpoints 108a-n can be any suitable devices for providing a user interface for a voice or video conference. Some of the endpoints can be capable of hosting the voice portion of the conference only or a part of the video conference (e.g., only display images of remote participants but not transmit an image of a local participant or only transmit an image of a local participant but not display images of remote participants) or all of the video conference (e.g., display images of remote participants and transmit an image of the local participant). The first and second endpoints at least capture and optionally display locally to the local participant images of remote participants. Examples of suitable devices include a cellular phone, tablet computer, phablet, laptop, personal computer, and purpose-built devices, such as the SCOPIA XT EXECUTIVE 240™, XT ENDPOINT™, XT1700™, XT4200™, XT4300™, XT5000™, XT embedded Server™, and XT Endpoint™ with embedded server products by Avaya, Inc. that can be modified as set forth herein.

The optional network video conference unit 104 and first, second, third, . . . nth endpoints 108a-n are connected by the network 112. The network 112 can be a local area network ("LAN"), a wide area network ("WAN"), a wireless network, a cable network, a telephone network, the Internet, and/or various other suitable networks in which a video conferencing system can be implemented.

Figure 2:
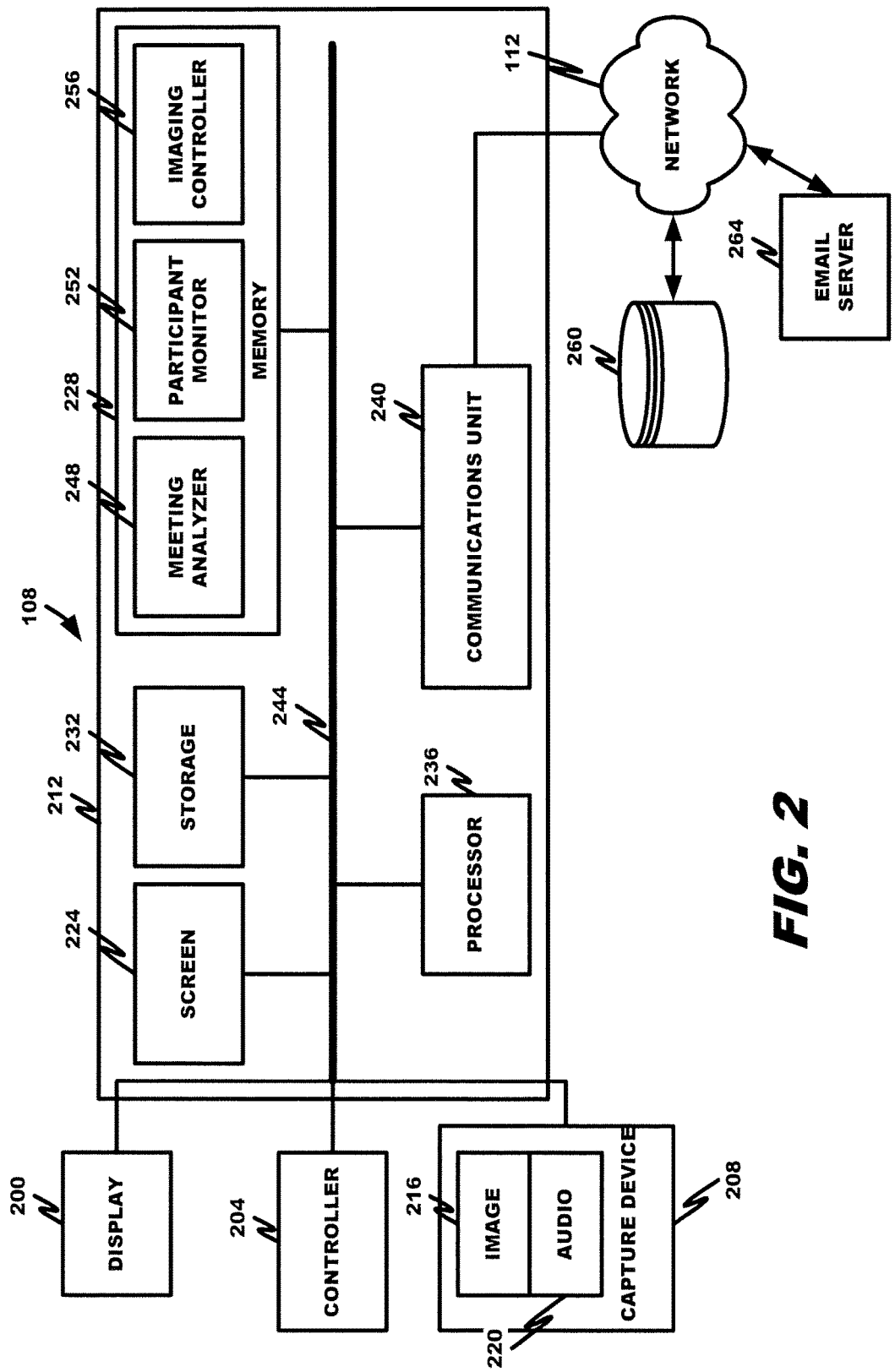
FIG. 2 is a block diagram depicting an endpoint configuration according to an embodiment of the disclosure.

With reference to FIG. 2, an exemplary endpoint is depicted. The exemplary endpoint 108 comprises a display device 200, a controller 204, a capture device 208, and a control unit 212.

The display device 200 can be any appropriate display or screen suitable to display an image stream received from the control unit 212. The display device 200 may display an image stream received at the control unit 212 from one of the remote video conferencing endpoints over the communications network 112. Alternatively and/or additionally, the image stream received from the image capture device 208 may be displayed by the display device 200 and/or processed by the control unit 212 before transmission to the display device 200.

The controller 204 can be any type of input devices, such as a keyboard, a pointing device (e.g. mouse, trackball, pointing stick, etc.), a remote control unit or a touchscreen device enabling a participant of the video conferencing room to interact with the control unit 212.

The capture device 208 can include an image capturing device 216, such as one or more still or video cameras capable of capturing 2-dimensional or 3-dimensional image information, and an audio capturing device 220, such as one or more microphones. The image capturing device 216 captures and provides image streams to the control unit 212. The image capturing device 216 typically comprises one or more mechanical or digital Pan-Tilt-Zoom (PTZ) cameras.

However, those skilled in the art will appreciate that other types of cameras may also be used. The audio capturing device 220 can comprise an array of microphones to capture and provide the audio streams to the control unit 212.

As will be appreciated, image information in the image streams typically includes plural pixels, with each pixel having an x,y,z spatial position or physical coordinates in the captured image and representing a sample of the image portion corresponding to the physical coordinates. In some contexts, the image portion sample refers to the entire set of component intensities for a spatial position. In other words, each of the pixels that represents an image sample stored inside a computer normally has a pixel value which describes how bright that pixel is or the pixel intensity and/or what color it should be. In the simplest case of binary images, the pixel value is a 1-bit number indicating either foreground or background. For a grayscale image, the pixel value is a single number that represents the brightness of the pixel. The most common pixel format is the byte image, where this number is stored as an 8-bit integer giving a range of possible values from 0 to 255. Typically zero is taken to be black, and 255 is taken to be white. Pixel values falling in the range of 0 to 255 make up the different shades of gray. To represent color images, separate red, green and blue components can be specified for each pixel (assuming an RGB colorspace), and the pixel "value" is a vector of three numbers. Often the three different components are stored as three separate "grayscale" images known as color planes (one for each of red, green and blue), which are recombined when displaying or processing. Multi-spectral images can contain even more than three components for each pixel, and by extension these are normally stored in the same way, namely as a vector pixel value or as separate color planes. The actual grayscale or color component intensities for each pixel may not actually be stored explicitly. Often, all that is stored for each pixel is an index into a colormap in which the actual intensity or colors can be looked up. In some contexts (such as descriptions of camera sensors), the term pixel refers to a single scalar element of a multi-component representation (more precisely called a photosite in the camera sensor context).

The control unit 212 generally comprises a display screen 224, a memory 228, a storage unit 232, a processor 236 and a communications unit 240. The control unit 212 can communicate (i.e. exchange audio and video information and/or any additional data), over the communications network 112, with the other video conferencing endpoints and the network video conference unit 104, access an enterprise database 260 comprising subscriber information, or interact with an enterprise email server 264 comprising subscriber email correspondence. This display screen 224 provides a command and control interface for the user. As will be appreciated, the display 200 and display screen 224 can be combined as a single display that not only provides images of remote participants but also provides the command and control interface.

The memory 228 can be any computer readable medium, such as a random access memory (RAM) or other dynamic storage device (e.g. dynamic RAM, static RAM, synchronous RAM, etc.) coupled to the bus 244 for storing information and instructions to be executed by the processor 236. Additionally, the memory 228 may be used to store temporary variables and/or other intermediate information during the execution of instructions by processor 236. It will be appreciated by those skilled in the art that the memory 228 may be a single memory or split into a plurality of memories. For example, a further memory may be provided such as a read only memory (ROM) or any other static storage (e.g. programmable ROM, erasable programmable ROM, and electrically erasable programmable ROM, etc.) coupled to the bus for storing static information and instructions for the processor 236.

The storage unit 232 can be a further computer readable medium, such as a magnetic hard disk, or a removable media drive (e.g. floppy disc drive, read-only compact disc drive, read/write compact disc drive, compact disc jukebox, tape drive, and removable magneto-optical drive), etc. coupled to the bus for storing other information and/or instructions.

The processor 236 can process any command received from a video conferencing user, triggered by the video conferencing endpoint 108 or received from the communications network 112 (e.g. from the network video conference unit 104 and/or from another video conferencing endpoint 108). In response to a received command, the processor 236 can retrieve and execute the relevant set(s) of instructions from one of the memories 228 and 232. Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM1926EJ-S™ processors, other industry-equivalent processors, and may perform computational functions using any known or future-developed standard, instruction set, libraries, and/or architecture. Those skilled in the art will appreciate that the present disclosure is not limited to this single processor arrangement but that one or more processors in a multi-processor arrangement may be employed to execute the set(s) of instructions retrieved from one of the memories.

Finally, the communications unit 240 is generally a communication interface providing a two-way communication coupling between the video conferencing endpoint 108 and the communications network 112. The communications unit 240 can receive any type of data information from the different devices of the video conferencing endpoint 108 such as the display device 200, the controller 204, and the capture device 208 and pass the data information to the processor 236 for further processing and/or to other video conferencing endpoints of the video conferencing system 100 over the communications network 112. Also, the communications unit 240 can receive any additional data information received by a further device present in the video conferencing endpoint 108. The communication unit 139 can exchange (e.g. transmit and receive) any suitable type of data information with a plurality of devices coupled to the control unit 212 and exchange information with remote video conferencing endpoints 108 or the network video conference unit 104 of the video conferencing system 100 over the communications network 112.

Included in the memory 228 of the control unit 212 are a meeting analyzer 248, participant analyzer 252, and imaging controller 256.

The meeting analyzer 248 can analyze the meeting parameters, content, and activity to determine an initial and in-progress focal point of the meeting. The meeting analyzer 248 typically considers various information sources in focal point determination. For example, the meeting analyzer 248 can access, via the enterprise database 260, electronic calendars of one or more participant subscribers to determine, from the Outlook™ meeting invitation, the meeting parameters (e.g., beginning and ending times, meeting duration, meeting attendee identities and locations, meeting attendee contact information (e.g., electronic addresses), identity of meeting organizer, enterprise hierarchy (or office or position) of the meeting participants, meeting subject, meeting agenda from the meeting notes, and meeting presentations or discussion topics from the attachments). The meeting analyzer 248 can access, via the email server 264, pre-meeting email threads among the communication devices of the participants regarding the meeting. Based on this information, the meeting analyzer 248 can employ natural language processing to determine, for instance, the organization or agenda of the meeting, such as who will be presenting or speaking, during what time interval, and about what topics, when the meeting is open for questions from other participants, and the like. The meeting analyzer 248 can track temporally the progression of the presenter through a presentation, such as a Microsoft Power Point™ presentation, and determine how many slides have been reviewed and/or how many slides have yet to be reviewed. With this information, text and speech recognition and biometric information can be used by the meeting analyzer 248 to identify audio cues as to the identity of the speaker, a current location in the meeting agenda, and the like.

The participant monitor 252 can acquire the facial images of each participant in the captured image using face detection techniques, acquire other object images in the captured image (such as a whiteboard, table, chair, and the like) using digital processing techniques, determine an identity of each acquired facial image by face recognition techniques using an identified biometric information of the participant, determine a spatial location of each participant relative to the capture device and to one or more other participants such as by motion detection, determine an active speaker using speaker localization and a microphone array, determine a point of focus of one or more participants in the room by gaze detection, and the like. The participant monitor 252, using face detection techniques, microphone array analysis, or motion detection, can detect a participant entering or leaving the monitored communication session area, e.g., room.

The meeting analyzer 248 and participant monitor 252 commonly provide the determined information to the imaging controller 256, which can determine, based on rules and user input, which image should be provided to remote participant endpoints at any point in time during the communication session, or to define a set of optimal views for the video conferencing session identified by image processing and contextual analysis. The imaging controller 256, for instance, is able to identify and adjust the capture device (e.g., adjust the pan, tilt or zoom of a camera) to a selected optimal view of the meeting area or participant or object therein at a selected time. By way of illustration, an optimal view could include having all participants in frame, in focus and centralized in the captured image, and having substantially the least background image information in frame. Other optimal views include whiteboard focus in which the whiteboard is in focus and centralized in the captured image, focus on a selected meeting participant (e.g., meeting manager, presenter, speaker, etc.) with the selected meeting participant being in focus and centralized in the captured image. Other optimal views will be appreciated by one of ordinary skill in the art. Once the target view is identified, the imaging controller 256 adjusts the captured image (e.g., moves the pan, tilt, and zoom of the camera) to produce this view.

Figure 8:
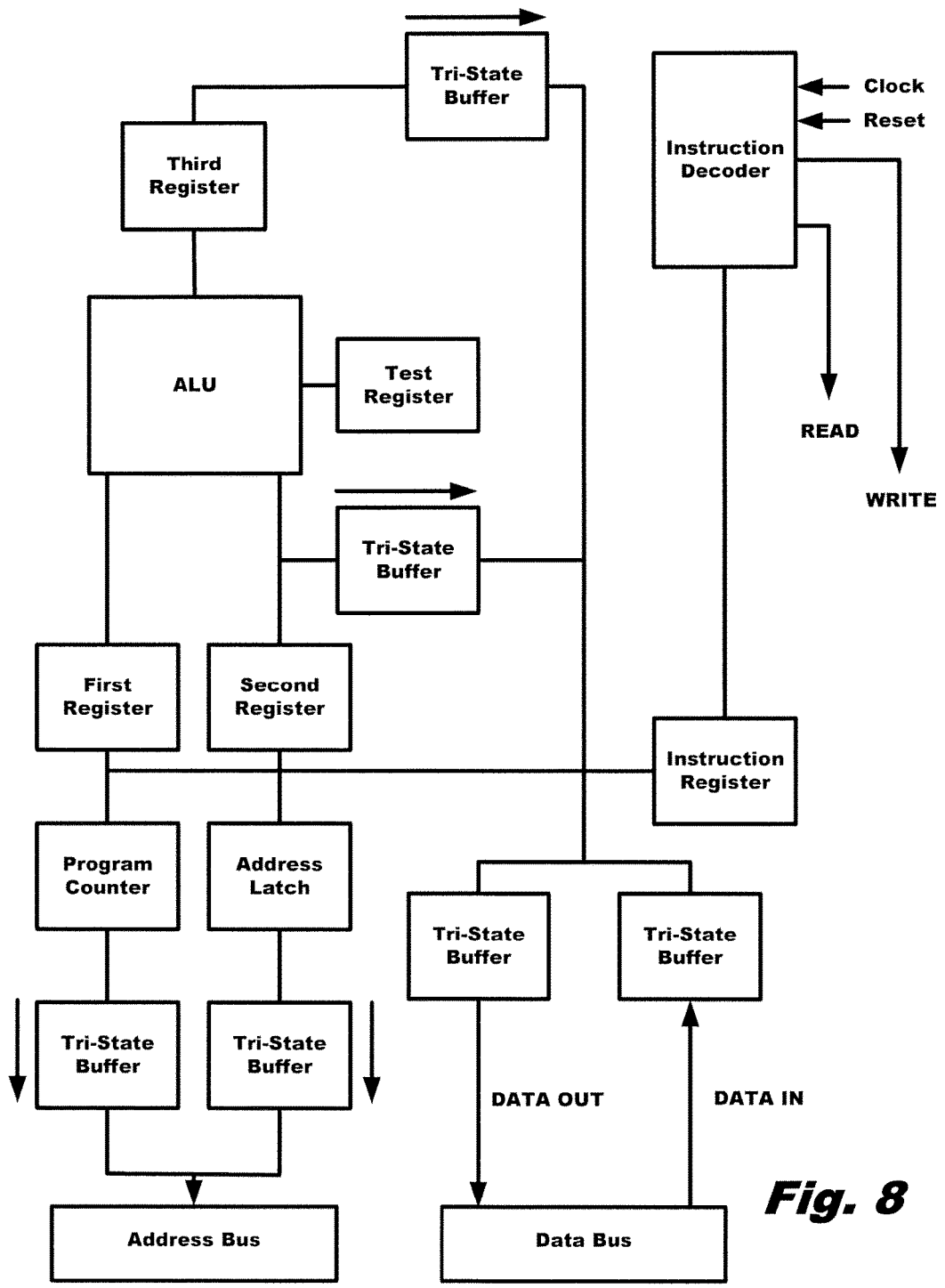
FIG. 8 is a block diagram of hardware for the control unit according to an embodiment.

With reference to FIG. 8, the control unit 212 can execute the meeting analyzer 248, participant analyzer 252, and imaging controller 256 using an arithmetic/logic unit ("ALU"), which performs mathematical operations, such as addition, subtraction, multiplication, and division, machine instructions, an address bus (that sends an address to memory), a data bus (that can send data to memory or receive data from memory), a read and write line to tell the memory whether to set or get the addressed location, a clock line that enables a clock pulse to sequence the processor, and a reset line that resets the program counter to zero or another value and restarts execution. The arithmetic/logic unit can be a floating point processor that performs operations on floating point numbers. The control unit 212 further includes first, second, and third registers that are typically configured from flip-flops, an address latch, a program counter (which can increment by "1" and reset to "0"), a test register to hold values from comparisons performed in the arithmetic/logic unit, plural tri-state buffers to pass a "1" or "0" or disconnect its output (thereby allowing multiple outputs to connect to a wire but only one of them to actually drive a "1" or "0" into the line), and an instruction register and decoder to control other components. Control lines, in the verification system, from the instruction decoder can: command the first register to latch the value currently on the data bus, command the second register to latch the value currently on the data bus, command the third register to latch the value currently output by the ALU, command the program counter register to latch the value currently on the data bus, command the address register to latch the value currently on the data bus, command the instruction register to latch the value currently on the data bus, command the program counter to increment, command the program counter to reset to zero, activate any of the plural tri-state buffers (plural separate lines), command the ALU what operation to perform, command the test register to latch the ALU's test bits, activate the read line, and activate the write line. Bits from the test register and clock line as well as the bits from the instruction register come into the instruction decoder. The ALU executes instructions for image capturing device(s) and audio capturing device(s) and display and playback of collected image and audio information.

Figure 3:
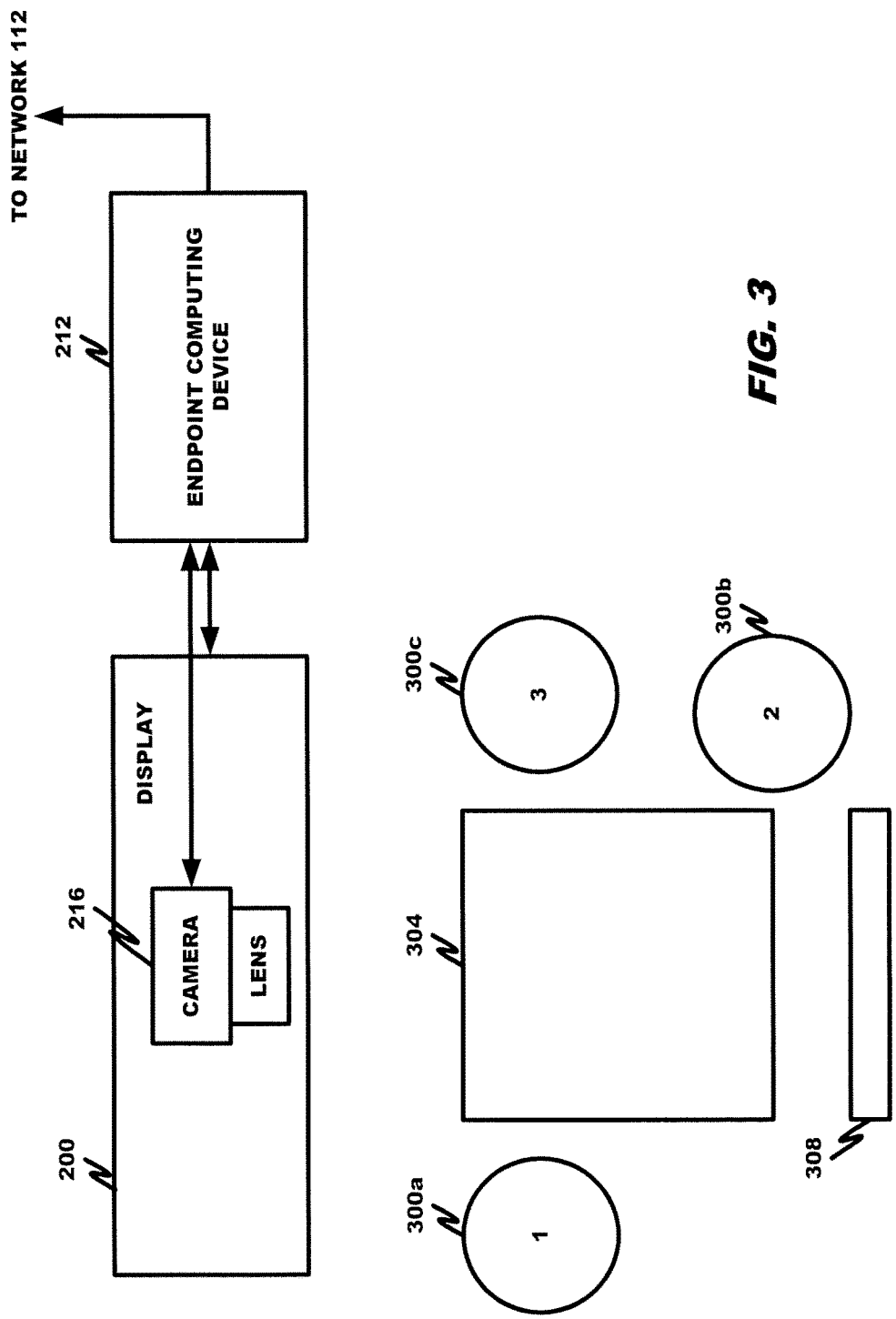
FIG. 3 is a block diagram an exemplary endpoint configuration during a video conferencing session.

An example of a video conferencing communication session will be discussed with reference to FIG. 3. The meeting room includes first, second, and third participants 300a, b, c, a conference table 304, and whiteboard 308. The participant monitor 252 detects the faces of each of the first, second, and third participants 300a-c, the table 304, and whiteboard 304 and identifies each of the first, second, and third participants 300a-c. At the beginning of the video conferencing communication session, the imaging controller 256 selects as the optimal view a view having the first, second, and third participants 300a-c in frame, in focus and centralized, with minimal background in the captured image. The imaging controller 256 adjusts the pan, tilt, and zoom of the camera 216 to produce this view. After the video conferencing communication session commences and after a selected time interval has elapsed, the second participant 300b becomes the active speaker and stands and walks to the whiteboard 304. The imaging controller 256, in response, selects as the optimal view a view having the whiteboard and second participant in frame, in focus and centralized, with neither the first nor second participant 300*a* and *b* in frame. The imaging controller 256 adjusts the pan, tilt, and zoom of the camera 216 to produce this view. Later in the meeting and after the selected time interval has again passed, the first participant 300*a* becomes the active speaker, and the imaging controller 256, in response, selects as the optimal view a view having the first participant in frame, in focus and centralized, with neither the second nor third participant 300*a* and *b* in frame. The imaging controller 256 adjusts the pan, tilt, and zoom of the camera 216 to produce this view. Later in the meeting and after the selected time interval has again passed, the first participant 300*a* starts presenting, through web conferencing software such as Avaya Aura Conferencing™, a PowerPoint™ presentation having 10 slides. The imaging controller 256, due to the number of slides and/or tracking the slide transitions from slide to slide, determines that the optimal view is the view having the first participant 300*a* in frame, in focus and centralized, with neither the second nor third participant 300*a* and *b* in frame. The imaging controller 256 further determines that all questions are to be asked at the end of the presentation and, when the presentation ends, selects as the optimal view a view having the first, second, and third participants 300*a*-*c* in frame, in focus and centralized, with minimal background in the captured image. The imaging controller 256 adjusts the pan, tilt, and zoom of the camera 216 to produce this view.

As shown by the above description, the changes in camera views are not automatic after every active speaker change or with every whiteboard demonstration. The transition between views is typically contingent upon passage of the selected time interval since the last view change and/or last detected speaker change. For example, if a participant speaks and/or works on the whiteboard for a period longer that X minutes, then the imaging controller 256 determines that it is worth adjusting the camera. Other factors can also impact this decision, such as speaker identity.

Figure 4:
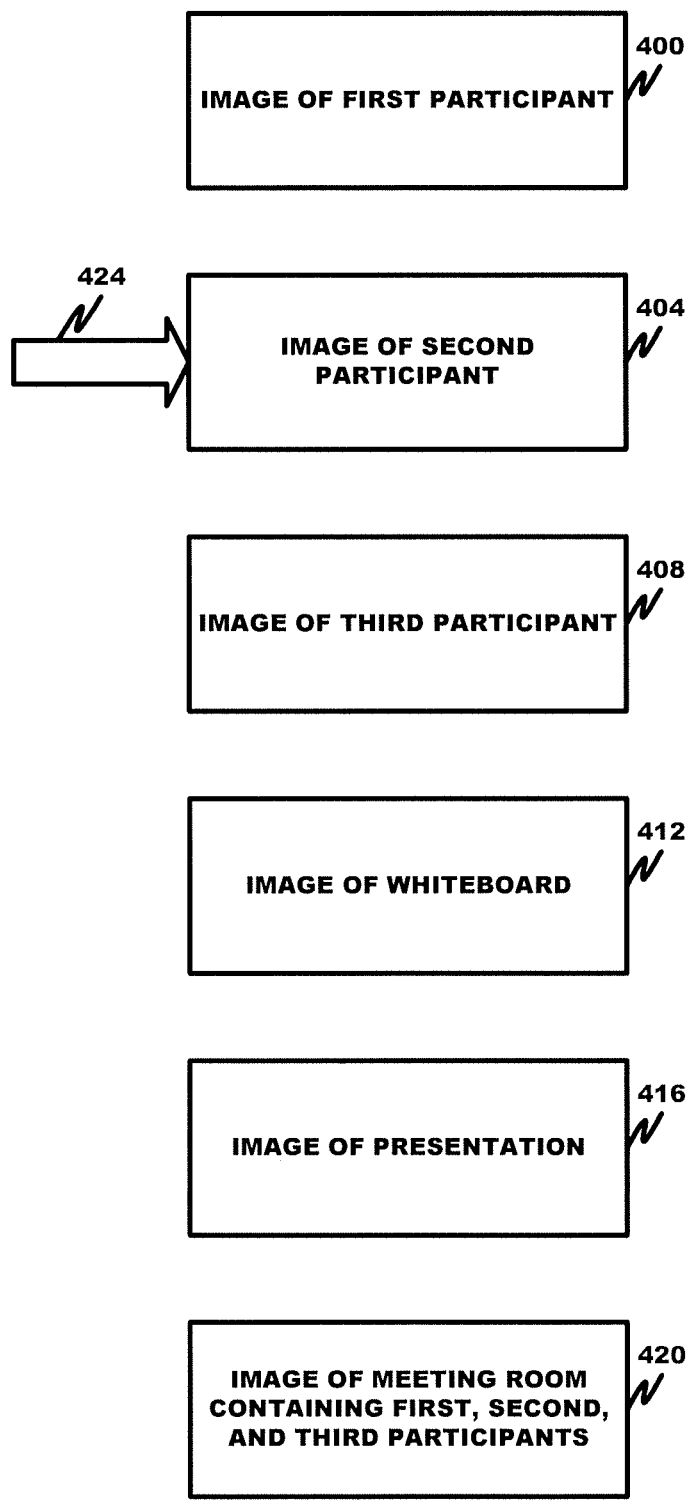
FIG. 4 depicts a series of object images extracted from a wide angle, high resolution digital image according to an embodiment of the disclosure.

An alternative capture device will now be discussed with reference to FIGS. 3 and 4. The camera is a digital camera having a high resolution and wide-angle lens (a lens having a focal length that is substantially smaller than the focal length of a normal lens for a given film plane) or ultra wide angle lens (a lens having a focal length shorter than the short side of the film or sensor, e.g., a focal length shorter than 24 mm). The digital camera typically has a horizontal field or angle of view of at least about 100 degrees, more typically at least about 110 degrees, and more typically at least about 120 degrees. The image resolution of the digital camera typically is at least about 10 million pixels, more typically at least about 15 million pixels, and even more typically at least about 20 million pixels. This can be accomplished using a high definition Complementary Metal-Oxide-Semiconductor ("CMOS") array. The camera does not employ mechanical pan, tilt and zoom but rather uses digital pan, tilt, and zoom. The captured digital image is commonly analyzed by the participant monitor 252 to extract images of each participant and non-participant object of interest. With reference to FIG. 4, the monitor 252 can extract and crop (or digitally zoom) an image of each of the first participant 400, second participant 404, third participant 408, whiteboard 412, and meeting room 416 (including the first, second, and third participants and whiteboard). While the digital camera can be adjusted as in the case of a PTZ camera, the monitored area is periodically scanned to identify participant changes as noted above. Generally, it is preferable to rely on digital zooming with little camera movement. Digital cropping (or upscaling) can be used to remove unnecessary background image information. Although not shown in FIG. 3, where a presentation is provided on a projector screen, the monitor can extract an image of the presentation on the screen 416. A marker or tag in the storage 232 indicates which of the images is currently being displayed by the displays 200 of the remote endpoints. Rather than adjusting the camera, the imaging controller 256 can simply select, as optimal, one of the extracted images as the new active image for display. This can avoid the delays and noise distractions caused by pan, tilt, and zoom camera adjustment.

Figure 5:
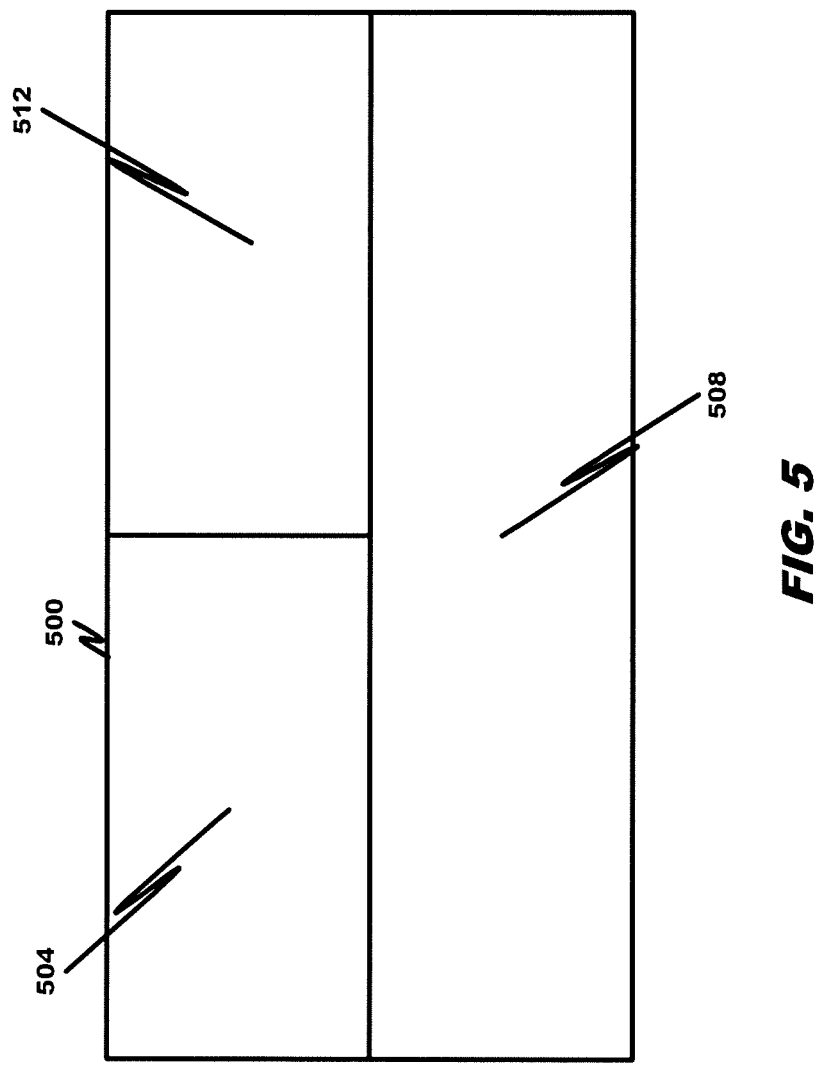
FIG. 5 depicts an exemplary layout provided to a remote endpoint during a video conferencing session.

The use of a high resolution and wide-angle digital camera can permit the remote endpoints to display a layout, such as shown in FIG. 5, which can be displayed on a full high definition (e.g., 4K resolution or more) display of a remote endpoint. The layout 500 includes first, second, and third windows 504, 508, and 512, respectively. Each of the first, second, and third windows 504, 508, and 512 displays a corresponding image. As will be appreciated, the layout 500 can have any configuration and any number of windows depending on the application. The images positioned in each window can be based on a number of criteria, such as current active speaker participant, current non-speaker participant(s), hierarchical participant position within the enterprise, current presenter participant, current non-presenter participant (s), focal point(s) of interest of participants (e.g., participant, whiteboard or projector screen), and the like. In one application, the first and third windows 504 and 512 display one or more participants while the second window 508 displays a presentation or whiteboard. Even though only a single camera is typically employed, the high resolution and wide angle digital image information can permit extraction of multiple high quality images, which can be displayed in the windows as desired. The imaging controller can select multiple optimal views rather than simply one. This can therefore be a highly versatile, simple and cost effective alternative to multiple independently adjustable cameras.

Figure 6:
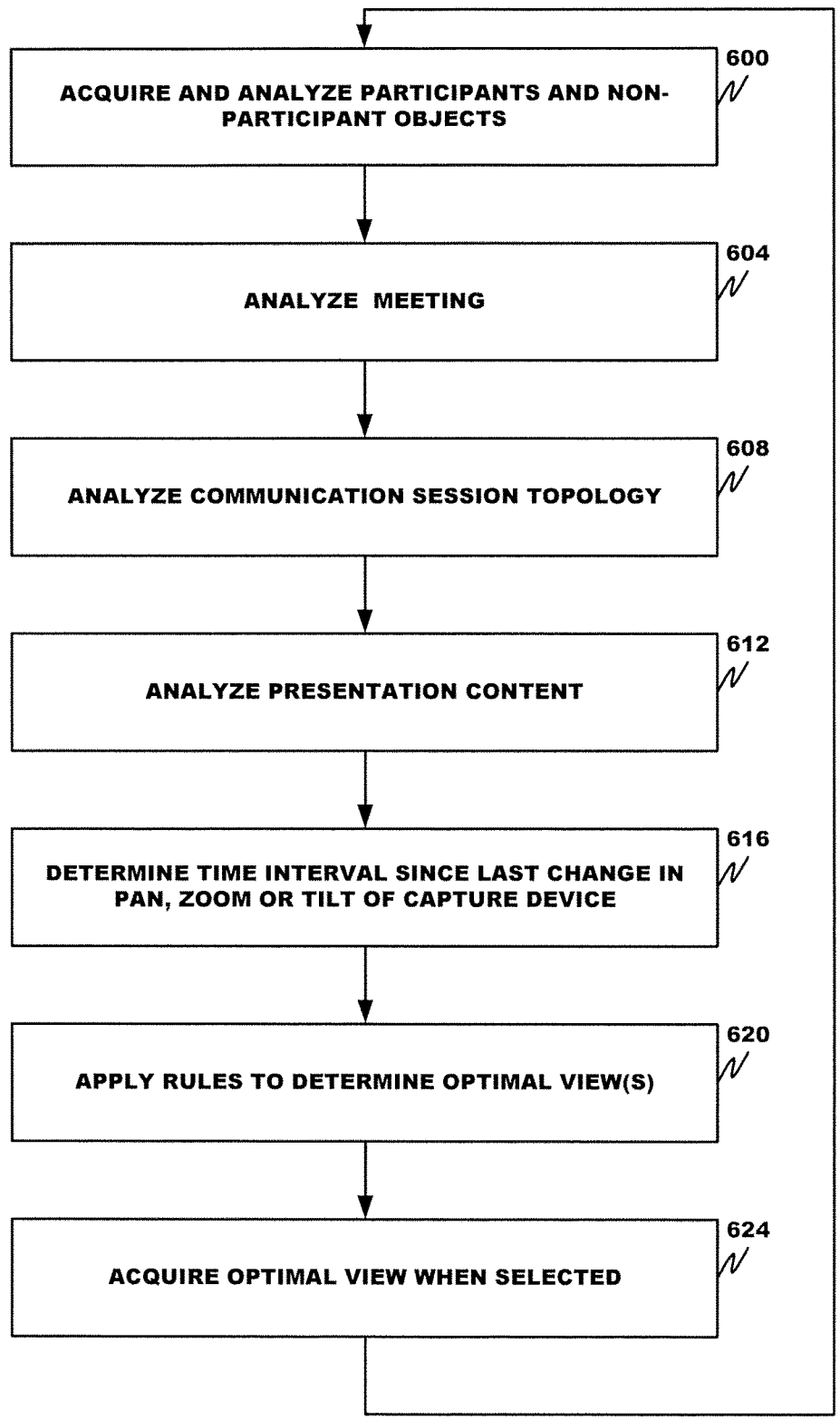
FIG. 6 is a flow chart depicting an image capture device control logic according to the embodiment.

The operation of the control unit 212 will now be described with reference to FIGS. 2 and 6.

In step 600, the participant monitor 252 acquires and analyzes participants and non-participant objects of interest in the monitored area for the communication session. It determines where participants are seated, what objects are in the room (such as whiteboard, table, and projector screen), and whether there are participants seated outside the field of view of the camera. The monitor 252 further determines whether there have been participant changes since the last image acquisition and analysis. Participant changes, for instance, include a new participant entering the room, a participant leaving the room, a participant moving to a seating location outside the field of view of the image capture device.

In steps 604, 608, and 612, the meeting analyzer 248 analyzes the meeting, communication session topology, and presentation context. The meeting analysis typically includes, for instance, analysis of the electronic calendars and email threads of one or more participant subscribers to determine the meeting parameters, and the presentation contextual analysis includes, for example, key word identification to identify, by text-to-speech or speech-to-text analysis of the communication session conversation, the current focal point(s) of the meeting. The communication session topology refers to the electronic addresses, capabilities, and preferences of the endpoints 108 to the communication session and the network video conference unit 104.

In step 616, the imaging controller 256 determines a time interval since a last change in the pan, zoom, or tilt of the capture device or the change in displayed image provided by the local endpoint 108. Too many view changes during the meeting over too short a period of time can be very distracting to participants. Typically a temporal threshold, such as at least about 3 minutes, is used to limit the frequency of view changes; that is, when the time interval since last displayed image change is less than the temporal threshold, no further image change is permissible.

In step 620, the imaging controller 256 applies rules to determine the optimal view(s) based on the input of the participant monitor 252 and meeting analyzer 248. The optimal views are selected based upon the current meeting state, as determined by the input, and timing of the last displayed image change. The imaging analyzer identifies points in time where the user experience benefits more from changing the view to be displayed by the remote endpoints than it would be disturbed by moving the camera or otherwise changing the view. Examples of times where the user benefit from the view change outweighs the user distraction include the start of the video conference, at selected points in time during a long video conference, and the like. Normally, the imaging controller 256 makes one to only a few view changes in the course of a single meeting. Where a participant has moved to a seat outside the field of view of the camera or a new participant has entered the room and selected a seat outside the field of view, the imaging controller 256 may elect to adjust the view in response to the participant entry or relocation or only once that participant starts speaking.

Different participant speakers can have different thresholds for view change from a first view to a second view. For example, the manager, when speaking, can have a lower threshold for view change from a first view not focused on the manager to a second view focused on the manager than a similar view change for another participant, when speaking. A higher level manager, when speaking, can have a lower threshold for view change from a first view not focused on the manager to a second view focused on the manager than a similar view change for a lower level employee, when speaking. Stated differently, hierarchical ranking of participants within an enterprise management structure can be used to determine a corresponding threshold for view change from a first view not focused on the participant to a second view focused on the participant when the participant starts speaking.

The control unit 212, when appropriate, commands the pan, tilt or zoom of the camera to be changed to implement the new view. The speed of the changes can be carefully controlled to avoid participant irritation.

The control unit 212 then returns to and repeats the above steps after a selected time interval has passed in the video conferencing communication session.

A "best view" button can be provided so that a participant can manually request an optimal view change at any point before or during the video conferencing communication session. This user command would override the determination of the control unit 212.

At set times during the video conferencing communication session, a participant or administrator can command an optimal view to be provided notwithstanding the determination of the control unit 212. For example, an optimal view can be provided after five minutes has passed since the initiation of the video conferencing communication session.

Even for a manual override or other participant or administrator command, the meeting analyzer still determines or computes the optimal view automatically. The only thing that is done manually is the invoking of a control at a single moment. For example, the participant user can press a button in the remote control that invokes the view optimization. Then, the camera can zoom out to get a full view of the room, and then zoom in and adjust according to scene analysis.

Meeting types can be used to provide default conference and viewing parameters for meeting venues and meeting organizers or hosts. In other words, different rule sets can apply to different types of meetings. Exemplary types of meetings are participant only meetings with no whiteboard or presentation and no speaker restrictions, meetings with only one designated speaker in the venue, meetings with a whiteboard in use, and meetings with a presentation.

Figure 7:
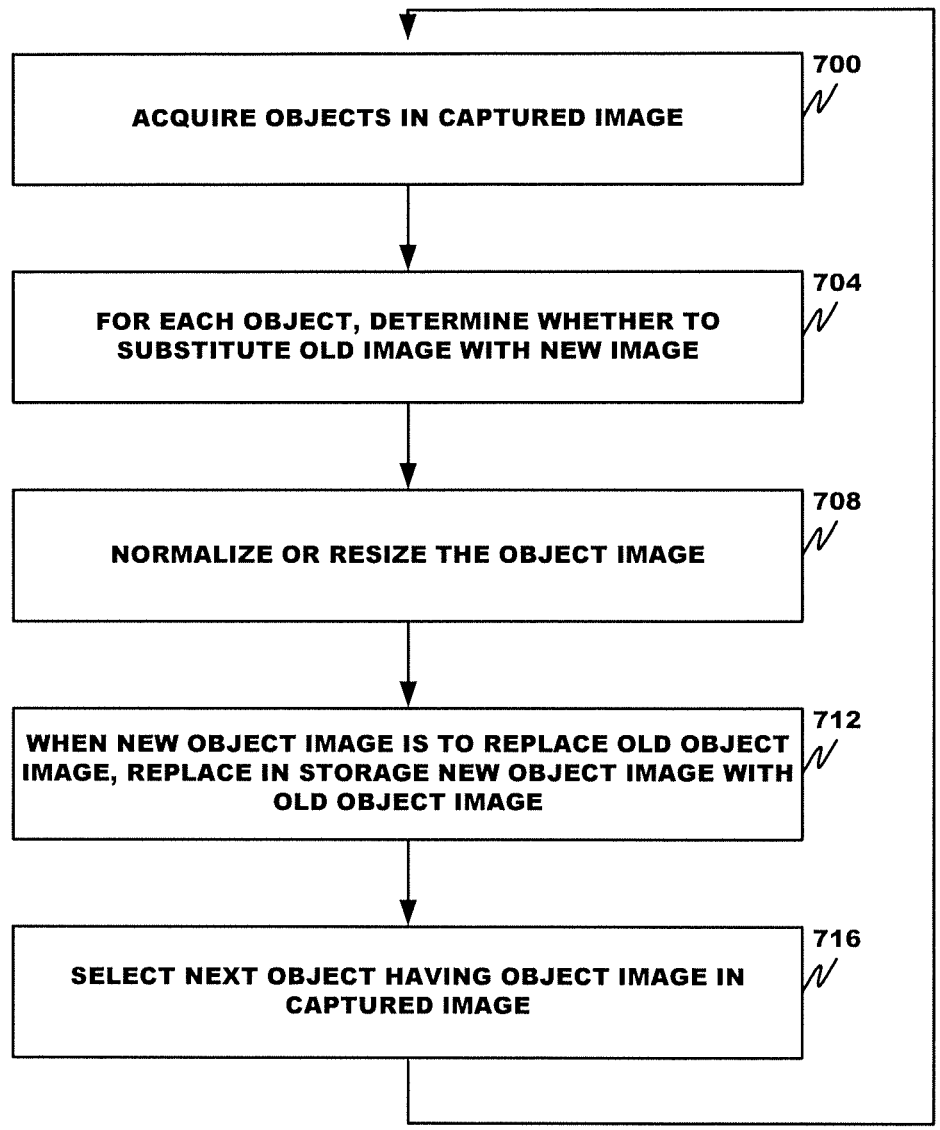
FIG. 7 is a flow chart depicting image processing logic according to the embodiment.

A further operation of the control unit 212 will now be described with reference to FIGS. 2 and 7.

In step 700, the capture device 208 has captured a high resolution and wide angle digital image of the monitored area or room, and the participant monitor 252 acquires participant and non-participant objects in the captured digital image.

In step 704, the participant monitor 252, for a selected object, determines whether to substitute a newly acquired image for a previously acquired image. This can depend on whether or not the object is of interest for display to a remote endpoint.

In step 708, the participant monitor 252, when the selected object image is selected to replace a previously acquired image, acquires and digitally crops and/or zooms an image of the selected object from the digital image and optionally normalizes or resizes the selected object image so that all of the images for the different objects appear to be equally sized or spaced equidistant from the capture device. Cropping can be done manually by a user by tactile contact with a touch screen and a user finger pinch or spread. The normalization may be accomplished by resizing the width and/or height of the facial image. Horizontal scaling may be accomplished by displaying one of two pixels when processing the image horizontally. Likewise, vertical scaling may be performed by skipping every other horizontal scan row during video processing. The normalization may allow each of the facial images to be properly displayed within a viewport. Furthermore, normalizing the facial images allows for the presentation of facial images in standard sized viewports to the party receiving the videoconference. Other scaling techniques may alternatively be used.

When a new selected object image is to replace a previously acquired selected object image, the new selected object image replaces, in storage, the previously acquired selected object image.

In step 716, the participant monitor 252 returns to step 700 and selects a next object in the captured image.

Any of the steps, functions, and operations discussed herein can be performed continuously and automatically.

The exemplary systems and methods of this disclosure have been described in relation to video conferencing communication sessions. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a server, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A video communication system, comprising:
   a wide angle and high resolution digital camera to acquire a digital image of a local participant during a video communication session;
   a computer readable medium; and
   a processor, coupled with the digital camera and the computer readable medium, wherein the computer readable medium comprises instructions that program the processor to extract a first image of a first set of objects and a second image of a second set of objects from the digital image and provide the extracted first and second images to a remote endpoint for display to another participant, wherein the first image is of the local participant, and wherein the first image of the local participant is extracted for display to the another participant based on a hierarchical ranking of the local participant in an enterprise management structure.

2. The system of claim 1, wherein the first and second sets of objects are provided simultaneously, as separate images, to the remote endpoint for display and wherein a field of view of the digital camera is at least about 100 degrees.

3. The system of claim 1, wherein the first and second sets of objects are provided simultaneously, as separate images, to the remote endpoint for display and wherein the resolution of the digital image is at least about 10 million pixels.

4. The system of claim 1, wherein the digital image is captured by one digital camera and wherein the first and second sets of objects are contained in a common image.

5. The system of claim 1, wherein the computer readable medium comprises:
   an imaging controller that programs the processor to select the digital image to be captured by the digital camera for provision to the remote endpoint for display to the another participant, the image selection being based on information describing the local participant or a context of the video communication session, wherein the processor conditions a change from providing, to the remote endpoint for display, a first image of a first set of objects selected at a first time to a different second image of a second set of objects selected at a second time upon a difference between the first and second times having at least a threshold magnitude.

6. The system of claim 5, wherein the processor controls a pan, tilt, or zoom of the digital camera based on the information describing the local participant or the context of the video communication session and wherein the information describing the local participant or the context of the video communication session comprises one or more of: local participant location based upon detection of a face of the local participant, an identity of the local participant, movement of the local participant from one location to another, use of a key word or phrase during the video communication session, an estimated meeting duration, or a meeting type or structure, wherein the information describing the local participant or the context of the video communication session is not based on active speaker detection or tracking, and wherein the context is determining a point of local participant focus based on one or more image processing or meeting content analysis.

7. A video communication system, comprising:
   a computer readable medium; and
   a processor, coupled with a high resolution digital camera and the computer readable medium, wherein the processor causes the high resolution digital camera to acquire a digital image of a local participant during a video communication session and wherein the computer readable medium comprises instructions that program the processor to extract a first image of a first set of objects and a second image of a second set of objects from the digital image and provide the extracted first and second images to a remote endpoint for display to another participant, wherein the first image is of the local participant, and wherein the first image of the local participant is extracted for display to the another participant based on a hierarchical ranking of the local participant in an enterprise management structure.

8. The system of claim 7, wherein the digital camera is a wide angle digital camera and wherein a field of view of the digital camera is at least about 100 degrees.

9. The system of claim 7, wherein the first and second sets of objects are provided simultaneously, as separate images, to the remote endpoint for display and wherein the resolution of the digital image is at least about 10 million pixels.

10. The system of claim 7, wherein the digital image is captured by one digital camera and wherein the first and second sets of objects are contained in a common digital image.

11. The system of claim 7, wherein the computer readable medium comprises:
    an imaging controller that programs the processor to select the digital image to be captured by the digital camera for provision to the remote endpoint for display to the another participant, the image selection being based on information describing the local participant or a context of the video communication session, wherein the processor conditions a change from providing, to the remote endpoint for display, a first image of a first set of objects selected at a first time to a different second image of a second set of objects selected at a second time upon a difference between the first and second times having at least a threshold magnitude.

12. The system of claim 11, wherein the processor controls a pan, tilt, or zoom of the digital camera based on the information describing the local participant or the context of the video communication session and wherein the information describing the local participant or the context of the video communication session comprises one or more of: local participant location based upon detection of a face of the local participant, an identity of the local participant, or movement of the local participant from one location to another, use of a key word or phrase during the video communication session, an estimated meeting duration, or a meeting type or structure, wherein the information describing the local participant or the context of the video communication session is not based on active speaker detection or tracking, and wherein the context is determining a point of local participant focus based on one or more image processing or meeting content analysis.

13. A method for controlling a camera during a video communication session, comprising:
> receiving, by a processor from a high resolution digital camera, a digital image of a local participant during a video communication session;
> extracting, by the processor, a first image of a first set of objects and a second image of a second set of objects from the digital image; and
> providing the extracted first and second images to a remote endpoint for display to another participant, wherein the first image is of the local participant and wherein the first image of the local participant is extracted for display to the another participant based on a hierarchical ranking of the local participant in an enterprise management structure.

14. The method of claim 13, wherein the digital camera is a wide angle digital camera, wherein the first and second sets of objects are provided as separate images simultaneously to the remote endpoint for display, wherein a field of view of the digital camera is at least about 100 degrees, and wherein the resolution of the digital image is at least about 10 million pixels.

15. The method of claim 13, wherein the first and second sets of objects are provided simultaneously to the remote endpoint for display, wherein the common digital image is captured by one digital camera, wherein the first and second sets of objects are contained in a common digital image, and wherein the first and second images are not selected based on active speaker detection or tracking.

16. The method of claim 13, further comprising:
> selecting, by the processor, the digital image to be captured by the digital camera for provision to the remote endpoint for display to the another participant during the video communication session, the image selection being based, at least in part, on information describing the local participant or a context of the video communication session, wherein the information describing the local participant or the context of the video communication session is not based on active speaker detection or tracking.

17. The method of claim 16, further comprising:
> conditioning, by the processor, a change from providing, to the remote endpoint for display, a first image of a first set of objects selected at a first time to a different second image of a second set of objects selected at a second time upon a difference between the first and second times having at least a threshold magnitude.

18. The method of claim 16, further comprising:
> controlling, by the processor, a pan, tilt, or zoom of the digital camera based on the information describing the local participant or the context of the video communication session, wherein the information describing the local participant or the context of the video communication session comprises one or more of local participant location based upon detection of a face of the local participant, an identity of the local participant, movement of the local participant from one location to another, use of a key word or phrase during the video communication session, an estimated meeting duration, or a meeting type or structure, wherein the image selection is not based on active speaker detection or tracking, and wherein the context is determining a point of local participant focus based on one or more image processing or meeting content analysis.

19. The system of claim 1, wherein the second image is extracted based on at least one of a participant leaving a room, a new participant entering the room, and a participant moving to a seat location outside a view of the digital camera.

20. The system of claim 1, wherein the second image is of a second local participant wherein the first and second images are digitally cropped and/or digitally zoomed to normalize or resize the first and second images to appear equally sized or spaced equidistant from the digital camera.

* * * * *